United States Patent [19]
Brooks

[11] Patent Number: 5,256,310
[45] Date of Patent: Oct. 26, 1993

[54] TREATMENT OF FRESH WATER FOR ZEBRA MUSSEL INFESTATION

[75] Inventor: Gary E. Brooks, Oklahoma City, Okla.

[73] Assignee: Exxon Chemical Patents Inc., Linden, N.J.

[21] Appl. No.: 18,924

[22] Filed: Feb. 16, 1993

Related U.S. Application Data

[63] Continuation-in-part of Ser. No. 861,290, Mar. 31, 1992, abandoned.

[51] Int. Cl.⁵ ............................................. C02F 1/76
[52] U.S. Cl. .................................. 210/747; 210/170; 210/242.1; 210/754; 210/764; 405/52; 405/127; 405/211; 422/6; 422/14; 422/37
[58] Field of Search ............... 210/747, 754, 764, 170, 210/242.1; 422/6, 14, 37; 405/211, 216, 127, 52

[56] References Cited

U.S. PATENT DOCUMENTS

| | | | |
|---|---|---|---|
| 5,008,075 | 4/1991 | Rufolo | 210/752 |
| 5,011,615 | 4/1991 | Minderman | 210/764 |
| 5,015,395 | 5/1991 | Muia et al. | 210/755 |
| 5,062,967 | 11/1991 | Muia et al. | 210/755 |
| 5,096,601 | 3/1992 | Muia et al. | 210/755 |
| 5,128,050 | 7/1992 | Gill | 210/755 |
| 5,141,754 | 8/1992 | Ekis, Jr. et al. | 210/754 |

*Primary Examiner*—Stanley S. Silverman
*Assistant Examiner*—Neil M. McCarthy
*Attorney, Agent, or Firm*—R. L. Graham

[57] ABSTRACT

A method whereby a concentrated aqueous solution of chlorine dioxide is injected into offshore water intake facilities for preventing zebra mussel infestation therein is described. The chlorine dioxide is generated from generators positioned on a portable vessel above the water intake facilities. The treatment using concentrated chlorine dioxide solution permits periodic treatment so that the same portable generators may be used to treat a number of water intake facilities.

12 Claims, 4 Drawing Sheets

TREATMENT OF FRESH WATER FOR ZEBRA MUSSEL INFESTATION

RELATED APPLICATION

This is a continuation-in-part of U.S. Application Ser. No. 861,290, filed Mar. 31, 1992, now abandoned.

BACKGROUND OF THE INVENTION

This invention relates to the treatment of fresh water sources to control and prevent infestation by zebra mussel. In one aspect, the invention relates to the treatment of fresh water intake pipes with concentrated solutions of aqueous chlorine dioxide.

The zebra mussel (biological name: *Dreissena polymorpha*) is a species of fresh water clam native to the Black and Caspian Seas and was accidentally introduced into the Great Lakes in 1986. These mollusks have migrated rapidly and the infestation has caused serious problems for water users and suppliers throughout the Great Lakes and adjacent water bodies. These problems are expected to only worsen in the future.

Water treating facilities, including municipal suppliers and industrial users, generally employ a water intake assembly known as a suction crib which is located offshore at distance ranging from 50 feet to 18,000 feet or more. The crib is a generally cylindrical structure with walls defined on the bottom by the lake bed, peripherally by a screen and rock pile formation formed around the screen, and on the top by a trash screen. The suction crib contains at its center a large diameter intake pipe for receiving fresh water and conducting the water to pumping and treating facilities onshore. It is common for eve large water treating facilities to draw all of its water from a single suction crib and intake pipe.

The infestation of the zebra mussel presents a serious problem to water treating facilities because they tend to adhere to submerged surfaces including metal, concrete, plastic, and even teflon. If left unchecked the mollusks will infest the intake crib, plug intake screens, restrict flow in the intake pipe, and affect water odor and taste.

The seriousness of the problem is described in the "Second International Zebra Mussel Research Conference" held in Rochester, N.Y. on Nov. 19-22, 1991, which was attended by more than three hundred registrants including research biologists, university students, consultants, end-users, and product and service representatives. As discussed at the conference, and highlighted in a paper entitled "Responding to the Zebra Mussel Threat—A Case History" by T. C. McTighe et al, methods for controlling zebra mussel infestation may be categorized as ecological, biological, mechanical, and chemical.

For various reasons including economy and long-term effectiveness (see the aforementioned paper for details), the chemical control method appears to offer the most feasible approach for controlling zebra mussel infestation of offshore water intake facilities. The chemical treatment involves introducing a biocide comprising an aqueous solution of oxidizing chemicals into the intake crib to destroy the mussels therein. These chemicals include free chlorine, potassium permanganate, chloramines, ozone, and hydrogen peroxide. Each of these chemicals have certain disadvantages which may limit their applicability in the treatment of potable or industrial water. For example, chlorine has the potential of forming carcinogenics such as trihalomethanes. Potassium permanganate is known to be less effective than the other oxidizers, while the use of ozone is not presently cost effective. Definitive research on the biological efficacy of chloramines and hydrogen peroxide are not well documented at the present time.

A presentation at the Second International Zebra Mussel Research Conference, referenced above, dealt with the effects of chlorine dioxide on Zebra Mussels. The only published part of the presentation is the Abstract which states "chlorine dioxide treatment resulted in mortalities of about 10-20% at the 0.2-0.3 ppm level with 100% mortality reached in 24 hours at concentrations greater than 0.5 ppm . . . The high effectiveness of chlorine dioxide at inducing zebra mussel mortality, coupled with the fact that the addition of chlorine dioxide forms less THM's than chlorine and chloramine, indicates that it may be preferred as an oxidizing agent for zebra mussel control at water treatment plant intakes even if slightly higher concentrations are needed."

There, however, was no discussion or suggestion of the manner or method in which to inject the chlorine dioxide.

T. C. McTighe's paper referenced above discusses the problems associated with zebra mussel infestation and describes in detail a proposed design to control infestation at one specific location, the Shoremont Water Treatment Plant located on the southern shore of Lake Ontario in Rochester, N.Y. The plant is owned and operated by the Monroe County Water Authority (MCWA).

The Shoremont Water Treatment Plant is fed by an intake pipe extending from shore 8,200 feet into Lake Ontario and terminating in an open intake fixed within a suction crib on the lake bottom at a depth of 40 to 50 feet. Fresh water is drawn into the intake pipe by an onshore pumping station. To control zebra mussel infestation in the suction crib and intake pipe, a design was established for injecting a biocide directly into the crib. The plan that was adopted was to extend a pipeline of small diameter through the intake pipe from the onshore pump facility to the suction crib. The line would then serve to conduct the treating chemical to the crib and provide a continuous injection of the biocide. The biocide selected in the initial design was a combination of chlorine (sodium hypochlorite) and permanganate oxidizers. However, the MCWA has chosen to use only sodium hypochlorite. The treatment involves the use of dose rates ranging from 0.08 milligrams per liter to 1.8 milligrams per liter delivered continuously to the crib at an average flow rate of 65 gallons per day.

Although this method appears effective in controlling and preventing infestation of the zebra mussel, it is extremely expensive to install (e.g. approximately two million dollars for the MCWA plant). In addition, this method is limited to intake pipes which permit the insertion of the biocide chemical line therein.

In summary, the infestation of the zebra mussel poses a serious problem for water treatment facilities having offshore suction intake and there is currently a need for a flexible and cost effective biocidal process for controlling the infestation.

SUMMARY OF THE INVENTION

The process of the present invention provides a method for chemically treating submerged offshore water intake facilities to remove and prevent infestation by the zebra mussel. A novel feature of the process is that the facility is treated with a concentrated solution of chlorine dioxide ($ClO_2$) and only for a relatively short periods of time and then discontinued until further treatment is required. The apparatus for performing the treatment process is also portable so that a single unit may be used to treat a number of such facilities as needed. Although the process may be adapted to any particular design of intake facility, it is expected to be of excellent utility in treating facilities comprising a suction crib containing an intake pipe.

In the treating process of the present invention, chlorine dioxide is the preferred biocide because it has been found to be very effective in killing zebra mussel; it can be produced safely and economically; and it avoids the problem of carcinogenic by-products such as trihalomethanes.

The central component for carrying out the process of the present invention is a chlorine dioxide generator (CDG) for reacting stable raw chemicals to form chlorine dioxide gas and further to combine the gas with lake or river water to form a concentrated aqueous solution of chlorine dioxide. Other required components include pumping means for delivering lake or river water to the CDG, raw chemical storage and facilities for delivering the reactants to the CDG, and flow line for conducting the treating solution from the CDG to the suction crib.

In the process of the present invention it is preferable to use a CDG to produce $ClO_2$ gas on site rather than transport the gas to the treatment site because $ClO_2$ is a highly reactive, unstable, and potentially explosive compound. Chlorine dioxide gas is potentially explosive when comprised or if concentration exceeds 10,000 mg/l in air. For safety the CDG is designed so that all of the generated $ClO_2$ is dissolved in water at a maximum concentration of 3,500 mg/l, preferably 3,000 mg/l.

In accordance with the present invention, a portable work platform is positioned above the crib and secured in place as by anchoring to the lake or river bottom. The platform supports the CDG and all other necessary equipment for performing the process and may be a barge, work-boat, or a jack-up platform. As described in detail below, the crib and intake pipe are chemically treated by delivering from the CDG to the crib, via a delivery pipe lowered into or adjacent the crib, a concentrated aqueous solution of chlorine dioxide.

For carrying out the process of the present invention, it is preferable for the water treatment plant pumping facilities to be in operation to assist in drawing the treating solution into the crib and the plant intake line. This mode of operation also has the important advantage that the entire plant is treated for controlling zebra mussel infestation since the treating chemical is drawn from the crib through the intake line and into the plant. Moreover, many pumping facilities cannot be economically shut down for treatment.

The delivery line for conducting the $ClO_2$ solution from the CDG to the crib may be fitted at the end with an elongate perforated sparger pipe for injecting the chemical over a larger area of the crib. At least two embodiments are envisioned. In the first, the sparger pipe is attached to the end of the delivery line and lowered from the platform and positioned in the crib (e.g. at or in the inlet of the intake pipe), or immediately above the crib intake screen and secured thereto. The treating chemical is injected through the sparger and drawn into the crib and plant intake line by the suction of the plant pumping facility. The delivery line and sparger pipe are withdrawn after the treatment. In the second embodiment, the crib is provided with a sparger pipe fixed permanently inside the crib with an attachment fitting protruding through the crib cover screen for receiving the delivery line and treating chemicals. After completion of the treatment, the delivery line is disconnected from the sparger and recovered while the sparger remains in the crib for the next treatment. The sparger pipe may comprise a pipe formed into a large-diameter ring for adapting with better geometric conformity to the cylindrically shaped crib and injecting the treating chemical over a larger area of the crib.

In operation, the treating process of the type described will be performed for the number of hours as needed to kill the zebra mussels. The delivery line will then be recovered and the treating unit may be moved for treating other intake facilities. It is expected that periodic treatment of intake facilities and water treatment plants using the process of the present invention will provide a cost effective and environmentally safe method of removing and preventing zebra mussel infestation.

The duration of the treatment and concentration of the treating solution will depend upon the severity of the problem and the size of and capacity of the facility. However, it is preferred to employ a treating period (either intermittent or continuous) for to 14 days at treating time intervals ranging from 1 week to 1 year, preferably 1 month to 1 year.

DESCRIPTION OF THE PREFERRED EMBODIMENTS

Figure 1:
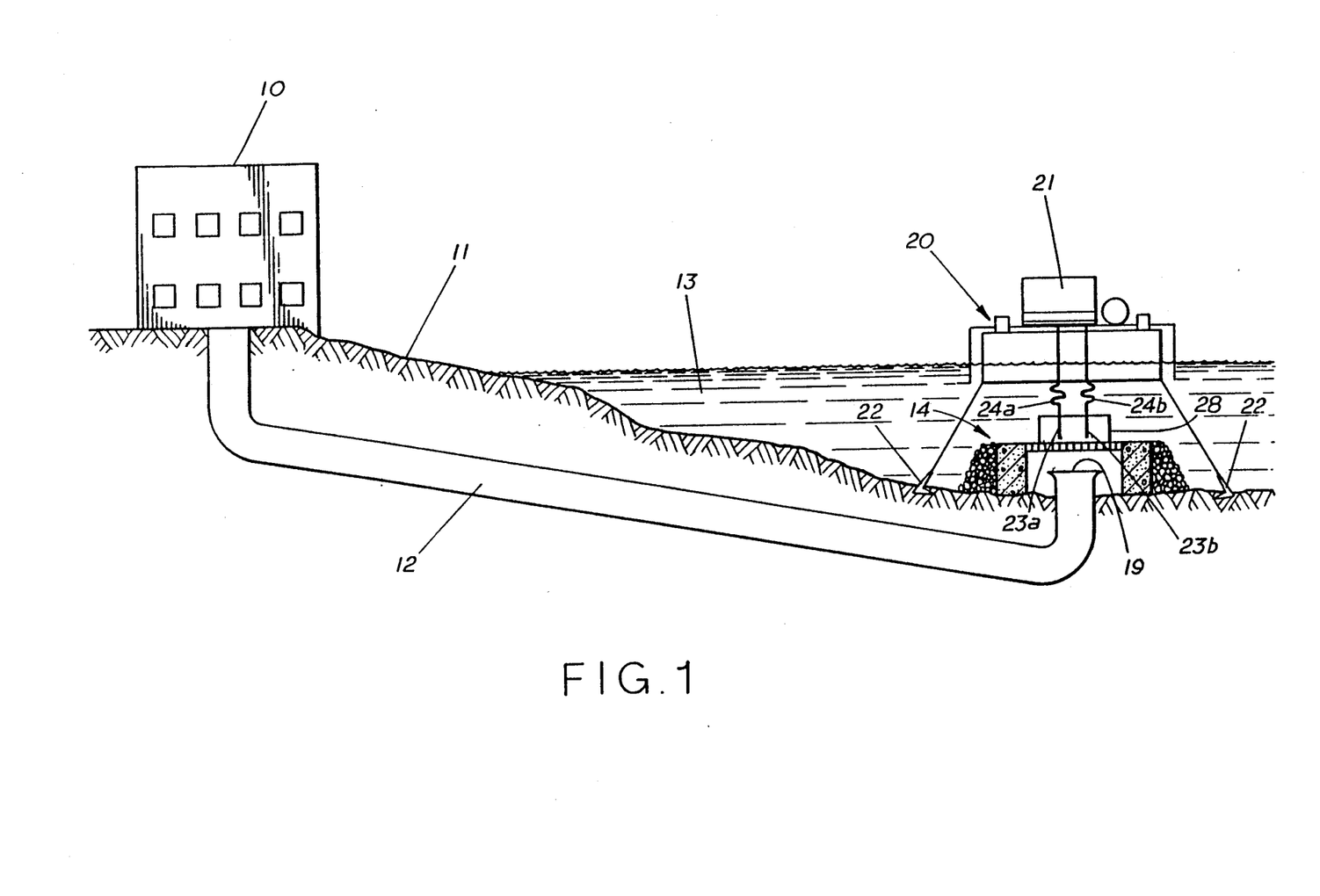
FIG. 1 is a schematic illustrating an onshore water pumping facility with offshore suction.
Figure 2:
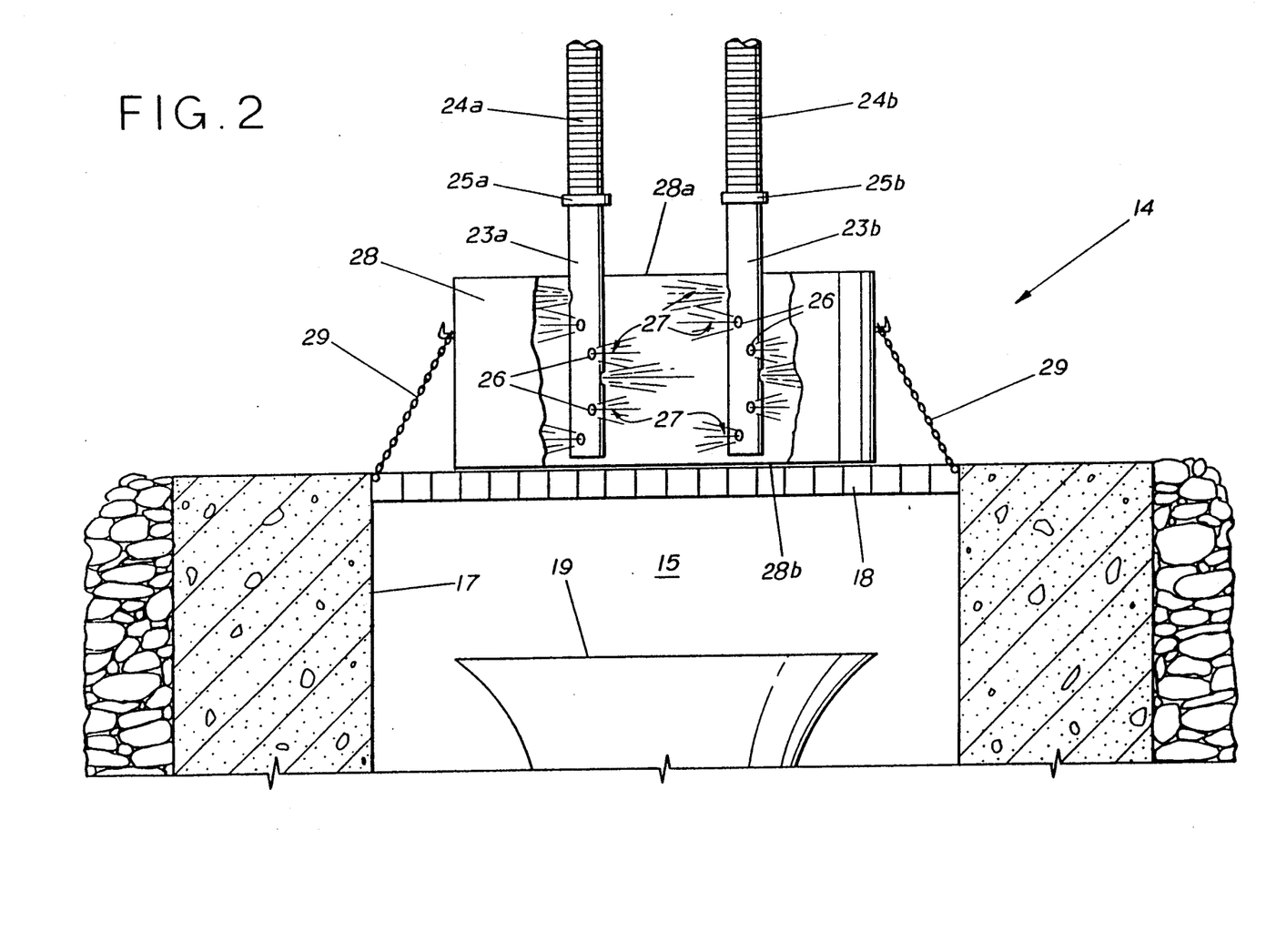
FIG. 2 is a sectional side view of an intake suction crib with sparger pipes positioned for treating the crib.

As illustrated in FIGS. 1 and 2, a typical pump facility comprises pump station 10 located on land 11 and having intake pipe 12 which extends into body of water 13. Suction crib 14 comprises chamber 15 enclosed by circumferential wall 17 and top screen 18.

In operation the water enters the crib through screen 18, flows into pipe intake 19, through pipe 12 to pump station 10, and thereafter is processed as in a municipal treating system or an industrial water source. The above description is representative of onshore water facilities with offshore suction.

The method of the present invention is particularly adapted to treating such systems by applying a biocidal solution of aqueous chlorine dioxide at the point of suction to control zebra mussel infestation of the water intake facility. It is preferred that the pumping unit of the water facility be in operation while carrying out the treatment with ClO$_2$ to assist in drawing the treating solution into the crib and intake pipe. In this mode of operation, the treating chemical not only disinfects the crib but also the entire water facility since the biocide also flows through pipe 12 into pumping station 10 and to the plant beyond, and does not interrupt the facility operation.

Briefly, the method according to the present invention involves the steps of:

(a) positioning a chlorine dioxide generator 21 at the surface of the body of water 13 at a site approximately above the suction crib 14;

(b) passing the water from the body of water through the chlorine dioxide generator 21 and discharging the water therefrom with from 100 to 3,500 (preferably 1,000 to 3,000) milligrams per liter of chlorine dioxide;

(c) injecting, in accordance with a predetermined treating period, the water containing the chlorine dioxide into the suction crib 14 to provide the water in the crib with an effective amount of chlorine dioxide to kill zebra mussel during the predetermined treating period;

(d) discontinuing the injection step;

(e) repeating steps (a) through (e) at intervals of time sufficient to prevent the buildup of zebra mussels in crib 14 and suction pipe 19.

The treating period ranges from 1 to 14 days and may be by continuous or intermittent injection.

Chlorine dioxide is an unstable, highly reactive gas which is soluble in water. It is therefore preferred to employ chlorine dioxide in an aqueous solution as generated by a chlorine dioxide generator. Such generators are disclosed in U.S. Pat. Nos. 4,077,879, 4,247,531 and 4,590,057 which are all incorporated herein by reference. These generators typically comprise a reaction zone in which compounds (e.g. alkaline chlorite and chlorine) are reacted to form chlorine dioxide which is transferred to an adductor by fluid (water) flowed through a venturi in the adductor. The venturi creates a low pressure zone for drawing the chlorine dioxide gas from the reaction zone into the adductor where it is absorbed by the water flowing therethrough to form a concentrated aqueous solution. In the present invention, lake water is flowed through the venturi for forming the solution. This process can generate chlorine dioxide levels in the aqueous solution up to 3,500, preferably up to 3,000 mg/l.

Referring again to FIGS. 1 and 2, work platform 20 is positioned above crib 14 and supports chlorine dioxide generator 21. The platform is anchored to the lake or river bottom using anchors 22 or, alternatively, pilings (not shown). The chlorine dioxide generator 21 is in fluid communication with sparger pipes 23a and 23b through flexible hoses 24a and 24b respectively. The sparger pipes are attached to the flexible hoses using unions 25a and 25b. Sparger pipes 23a and 23b are sealed at the end and are provided with a plurality of injection holes 26 around the pipe for injecting biocidal solution 27 therethrough. Thus, biocidal solution produced in chlorine dioxide generator 21 is pumped through the flexible hoses 24a and 24b, into the sparger pipe 23a and 23b, and injected in to the lake water at or near the intake line suction through sparger pipe holes 26 and is drawn into the line without affecting water outside the crib.

Sparger pipes 23a and 23b are fixed to shroud 28 by suitable securing means (not shown). Shroud 28 is positioned above crib 14 and anchored thereto with anchor lines 29. Shroud 28 has open ends 28a and 28b for allowing lake water to flow therethrough under the suction action of the water pumping station 10. With the water plant pumping facility in operation, lake water flows into shroud 28 through end 28a, entrains biocidal solution 27 injecting through sparger holes 26, enters the crib through cover screen 18, and flows into pipe intake 19 to remove any zebra mussel attached thereto. The biocide solution entering the crib will also fill the crib chamber 15 by the action of turbulent eddies and mass diffusion to disinfect the crib. Shroud 28 serves to generally contain the biocide in a region above the crib. Although two sparger pipes are shown, a single pipe or additional pipes may be used as needed.

After the treatment is complete, hoses 24a and 24b are disconnected at unions 25a and 25b, respectively, and recovered to platform 20. Shroud 28 and sparger pipes 23a and 23b fixed thereto may be recovered using a crane after disengaging anchor lines 29. Alternatively, by disconnecting the sparger pipes from the flexible hoses at unions 25a and 25b and recovering the hoses only, the shroud and sparger pipes may be left anchored to crib 14 to facilitate future treatments. In either case, the work platform 20 may then be moved to treat other intake facilities.

Figure 3:
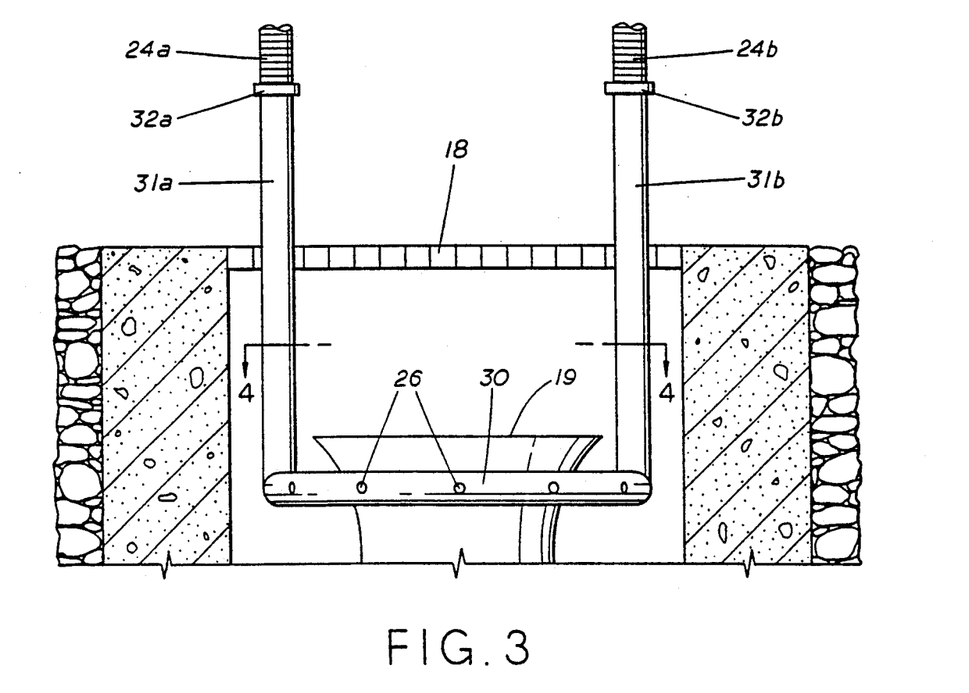
FIG. 3 is a side view of a suction crib provided with a ring-shaped sparger pipe fixed therein for treating the crib.
Figure 4:
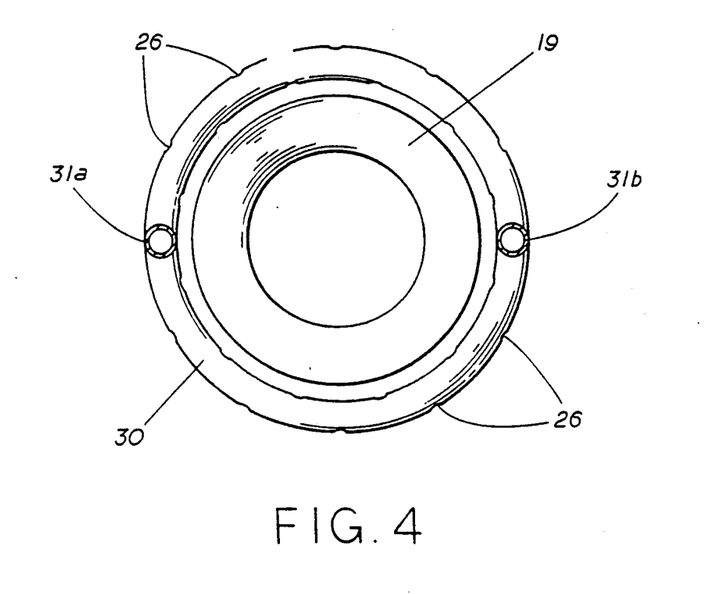
FIG. 4 is a top view of a ring-shaped sparger pipe shown in FIG. 3.

FIGS. 3 and 4 illustrate an alternate embodiment of the sparger pipe employing a ring-shaped sparger pipe 30 fixed permanently in crib chamber 15. Sparger pipe delivery lines 31a and 31b protrude upwardly through crib screen 18 and terminate in unions 32a and 32b, respectively, for receiving flexible hoses 24a and 24b. The sparger is provided with a plurality of holes 26 around the periphery for injecting the biocide therethrough. Once the hoses are connected, the biocide injection proceeds as has been described. This configuration has the advantage that the biocide is injected directly into the crib. In addition, the ring-shaped sparger is able to distribute the biocide uniformly over the volume of the crib. As noted above, the sparger pipes 23a and 23b may be inserted into the intake pipe further protecting the water outside the crib from ClO$_2$ contamination.

Figure 5:
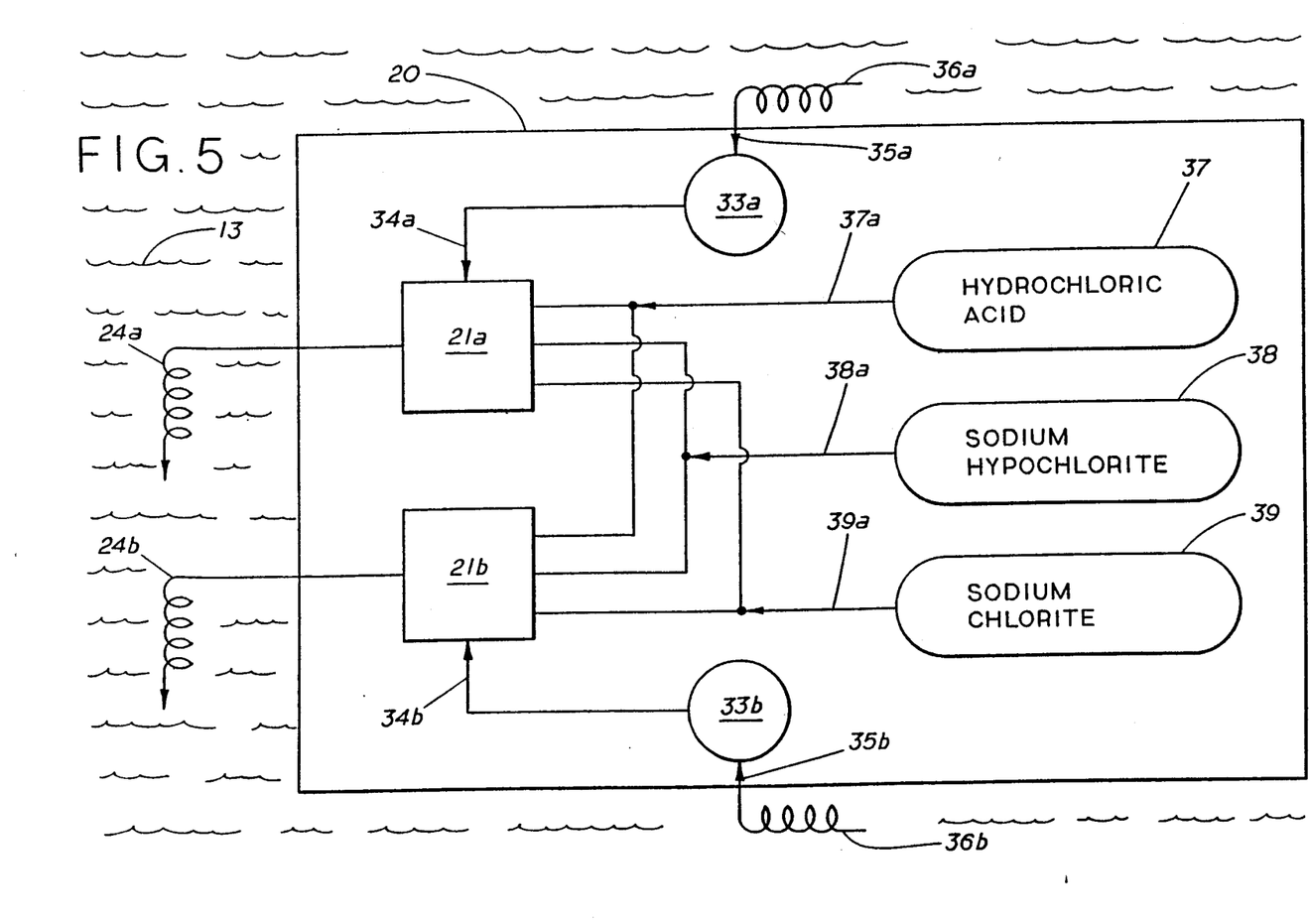
FIG. 5 is a schematic of the portable treating unit one embodiment for carrying out the method of the present invention.

FIG. 5 is a schematic showing a preferred embodiment of the main components of the treating system as supported on platform 20. All equipment and flow lines are mounted on the deck of 20. The schematic is a simplified representation of the system and certain variations are possible, as would be obvious to one skilled in the art, without departing from the inventive concept described herein.

As mentioned above, the CDG's 21 may be of the type disclosed in U.S. Pat. Nos. 4,077,879, 4,247,531 and 4,590,057 are well suited for adaptation to the present invention and are all incorporated herein by reference.

U.S. Pat. No. 4,247,531 teaches the use of a CDG for reacting raw chemicals comprising a metal chlorite (e.g. NaClO$_2$), a metal hypochlorite (e.g. NaClO), and a mineral acid (e.g. HCl) in a reaction chamber to form ClO$_2$ gas (other reactants such a free chlorine may also be used). The CDG further comprises a venturi for discharging a low pressure stream of water into a chamber which is in fluid communication with the reaction chamber. The low pressure chamber acts as an adductor for drawing the ClO$_2$ gas into the water stream which absorbs the gas thereby forming an aqueous solution of ClO$_2$. The solution is discharged continuously from the CDG through an outlet pipe for use. The concentration of the aqueous solution is controlled by controlling the flow rates of reactants into the CDG.

In relation to the process of the present invention, the CDG disclosed in U.S. Pat. No. 4,247,531 has been shown to have excellent efficiency (70 to 100 percent) of conversion of raw chemicals to $ClO_2$ and thereby improves the cost effectiveness of the present process. The aforementioned CDG also has the advantage that the $ClO_2$ gas is adducted from the reaction chamber at virtually the same rate at which it is produced, and this improves the safety of the process since the potentially explosive $ClO_2$ does not accumulate in the CDG. CDG's of the type described have a capacity of up to 24,000 pounds of $ClO_2$ per day and, if necessary, can be operated in parallel to provide larger volumes of treating solution. Other types of CDG's may also be used.

Two chlorine dioxide generators 21a and 21b illustrated in FIG. 5, although any number can be used. The generators 21a and 21b are operated, fed with lake water by pumping means 33a and 33b, respectively, through lines 34a and 34b. Pumps 33a and 33b have intake lines 35a and 35b, respectively, with suction 36a and 36b, respectively, positioned below water surface 13.

Generators 21a and 21b are fed reactants from storage containers 37, 38, and 39 through flow lines 37a, 38a, and 39a, respectively, Inside the generators, the chemicals react to form chlorine dioxide gas which is adducted and absorbed by the lake water entering the generators through lines 34a and 34b to form a concentrated aqueous solution of chlorine dioxide. The solution thus formed discharges into inlets of flexible hoses 24a and 24b for conducting the solution to the submerged sparger pipes for treating the crib as has been described. The concentration of the solution is controlled by controlling the flow rates of the raw chemicals into the generators. The preferred reactants are hydrochloric acid, sodium hypochlorite, and sodium chlorite. However, other reactants for producing chlorine dioxide are possible as discussed, among other places, in U.S. Pat. Nos. 4,247,531 and 4,590,057.

As mentioned previously, the method for treating the Monroe County Water Authority's Shoremont plant involved the use of an injection line which extended within the intake line 12 from the pumping station 10 to the suction crib 14. The cost of treating the same facility over a one year period using the process of the present invention would only be a fraction of the cost required by the injection line design. The treatment of the Shoremont plant according to the present invention would be as follows:

(a) a plant water throughput rate of 12 to 140 million gallons (typical 100 million gallons) per day during the treatment;

(b) a chlorine dioxide solution flow rate of 1100 pounds per day;

(c) number of generators: 1 rated at 2,000 pounds per day;

(d) length of treatment in hours: 96;

(e) frequency of treatment: 3 to 4 times per year;

In operation, the work boat or barge 20 is moved to the injection site and secured by anchors 22 or pilings above the suction crib 14. The shroud 28 and sparger pipes 23a and 23b and then secured at or in the crib 14 as has been described. The flexible hoses 24a and 24b for delivering the biocide are then attached to the sparger pipe intake using unions as has been described. Divers may be used for making underwater connections, securing equipment and inspecting for leaks during $ClO_2$ injections.

The biocide production and delivery system comprising the chlorine dioxide generators 21a and 21b, lake water pumps 33a and 33b for feeding the generators 21a and 21b, and raw chemical delivery tanks 37, 38, and 39 will be operated continuously while preferably the plant pumping station 10 continues to suck water with the $ClO_2$ solution into the intake 19. The treatment would continue for a predetermined time period until the zebra mussel infestation is reduced to an acceptable level. The plant pumping rate may be at normal rates or from 10 to 90 percent of normal rates. $ClO_2$ injection and pump station operation for the majority of the $ClO_2$ injection will be carried out simultaneously.

Following the treatment, the generators are shut down and the generators, hoses, and sparger pipes are flushed with fresh lake water using pumping means 33a and 33b to remove any chlorine dioxide in the lines. The hoses and sparger pipes may then be retrieved as has been described. This frees the portable treating unit for use at other sites.

The cycle can be repeated 2 to 6 times for each predetermined time period which can range from 1 day to 14 days.

In the intermittent and continuous treatments, the concentration of the $ClO_2$ in the treated water should be maintained at an average of not more than 5 mg/l (preferably not more than 4 mg/l and most preferably not more than 2 mg/l and typically from 0.25 to 2.00 mg/l) over the predetermined treatment period. These concentrations represent the concentration throughout the infested area. The intermittent injection can involve higher concentrations because of the shorter injection phases. These can range as high as 10–20 mg/l, but the average for the injection period (injection phase plus noninjejction phase) should be within the ranges recited above.

The continuous injection may be carried out as follows:

|  | Range | Preferred | Most Preferred |
|---|---|---|---|
| Injection Period | 1 to 14 days | 2 to 10 days | 2 to 7 days |
| $ClO_2$ concentration in treatment water | 0.25 to 5 mg/l | 0.5 to 2 mg/l | 1.0–1.5 mg/l |
| Frequency |  |  |  |
| Min. | 1 treatment/yr. |  |  |
| Max. | 1 treatment/wk. |  |  |
| Range | 1 wk.–1 yr. | 1 mo.–8 mo. | 2 mo.–6 mo. |
| Generated $ClO_2$ Concentration | 100–3500 mg/l | 500–3000 mg/l | 1000–3000 mg/l |

EXPERIMENTS

Flow loop experiments were carried out to determine the effect of $ClO_2$ on zebra mussel mortality. The flow loop consisted of a 1½ inch PVC pipe (approximately 40 feet in length) with flow cells spaced therealong. The flow cells were dispersed to contain the zebra mussel and consisted of 2-inch diameter, 10-inch length pipe nipple with ⅜ inch baffle positioned in the bottom to retain zebra mussels. One or two flow cells were located upstream of the $ClO_2$ injection point and 3 to 6 downstream. One end of the PVC line was connected to a pump fed by a heated water reservoir. The other end was provided with a pressure gage, a flow meter, and throttle valve. A flexible hose connected downstream of the throttle valve returned the flow to the reservoir or to drain. $ClO_2$ injection was from a canister into the PVC line. The $ClO_2$ was aqueous solution generated by a Rio Linda $ClO_2$ generator.

Three series of tests were carried out: (1) single batch treatment; (2) intermittent treatment; and (3) continuous treatment.

The test procedure for each test was as follows:
(1) Load zebra mussels into flow cells (10 to 40 per cell).
(2) Begin water flow at 100 BWPD (0.50 fps in PVC line).
(3) Flow for predetermined time.
(4) Initiate $ClO_2$ treatment at the recommended dose and duration (with return hose placed in drain so that no $ClO_2$ is recycled).
(5) Check $ClO_2$ residuals at loop outlet.
(6) Rinse system 15 minutes (44 gallons).
(7) Check for zebra mussel mortality.

The zebra mussel mortality was determined at the conclusion of the test in question (3 to 7 days).

Single Batch Treatment: $ClO_2$ was injected at the concentration and duration shown in TABLE I.

TABLE I

SINGLE BATCH TREATMENT

| TEST NO. | DOSE, MG/L | DURATION | % MORTALITY |
|---|---|---|---|
| A | 20 | 5 minutes | 16.6 |
| B | 36 | 4 minutes | 23.3 |
| C | 544 | 41 seconds | 33.3 |
| D | 50 | 5 minutes | 36.7 |
| E | 60 | 5 minutes | 32.5 |

From these data, it can be seen that short duration treatments are not effective, producing mortalities of 16.6 to 36.7%. As noted above, mortalities of at least 50% are preferred, although in some treatments it may be desirable to produce a lower mortality rate to avoid plugging the system with zebra mussel debris.

Intermittent Treatment: In this treatment, the water was continuously flowed through the PVC line and $ClO_2$ injected at the specified concentration, duration, and frequency. The mortality was measured at the conclusion of the multiple injections. The data are presented in TABLE II.

TABLE II

INTERMITTENT TREATMENT

| TEST NO. | DOSE, MG/L | DURATION | INTERVALS BETWEEN PREVIOUS INJECTIONS (Minutes) | TREATMENT PERIOD (MINUTES) |
|---|---|---|---|---|
| F | 98 | 60 seconds | | |
| | 139 | 39 seconds | 70 | |
| | 752 | 38 seconds | 95 | 167.5 |
| 33% Mortality | | | | |
| G | 35 | 5 minutes | | |
| | 35 | 5 minutes | 55 | |
| | 35 | 5 minutes | 55 | |
| | 35 | 5 minutes | 55 | |
| | 35 | 5 minutes | 55 | |
| | 35 | 5 minutes | 55 | |
| | 35 | 5 minutes | 55 | 305 |
| 63.3% Mortality | | | | |
| H | 20 | 5 minutes | | |
| | 20 | 5 minutes | 55 | |
| | 20 | 5 minutes | 55 | |
| | 20 | 5 minutes | 55 | |
| | 20 | 5 minutes | 55 | |
| | 20 | 5 minutes | 55 | 305 |

TABLE II-continued

INTERMITTENT TREATMENT

| TEST NO. | DOSE, MG/L | DURATION | INTERVALS BETWEEN PREVIOUS INJECTIONS (Minutes) | TREATMENT PERIOD (MINUTES) |
|---|---|---|---|---|
| 30% Mortality | | | | |

From these data, it can be seen that the intermittent operation gave the best results. The intermittent treatment can have injection phases ranging from 1 to 2 hours and noninjection phases ranging from 1 to 24 hours.

Continuous Treatment: In this treatment, the loop was closed (using a small drum pump suction) so that the $ClO_2$ solution was recycled. The return hose discharged into the suction drum. The dosage, accumulative injection time, and mortality are shown in TABLE III.

TABLE III

CONTINUOUS TREATMENT

| TEST NO. | DOSE, MG/L | EXPOSURE TIME HOURS | % MORTALITY |
|---|---|---|---|
| I | 14.8 | 6 | 40 |
| | | 9 | 50 |
| | | 24 | 100 |
| | | 24 | 100 |
| | | 24 | 100 |
| J | 9.3 | 4 | 10 |
| | | 8 | 10 |
| | | 12 | 30 |
| | | 24 | 90 |
| | | 24 | 90 |
| K | 3.8 | 4 | 0 |
| | | 8 | 30 |
| | | 12 | 0 |
| | | 24 | 50 |
| | | 24 | 60 |
| L | 2.1 | 4 | 0 |
| | | 8 | 10 |
| | | 12 | 0 |
| | | 24 | 10 |
| | | 24 | 0 |

After a predetermined time, a cell was removed from the line and the mortality percentage measured. This was repeated until all of the cells had been removed. At 2.1 mg/l, no significant mortality occurred. However, for longer treatments, it is believed the satisfactory mortality will occur at 2.0 mg/l of $ClO_2$. At 3.8 mg/l 50-60% mortality occurred, but only after 24 hours.

Additional tests were carried out with a similar loop system, except only one cell was used upstream of the $ClO_2$ injection point. (The units of concentration of ppm and mg/l are used interchangeably herein.)

Single batch treatments were carried out using a variety of chemicals ($ClO_2$, NaOCl, $KM_nO_4$, $H_2O_2$, and $NaClO_2$) flowing at a concentration of 30 ppm for 30 minute exposure. The results indicated that $CO_2$ provided zebra mortality of 70%, almost three times better than the next best chemical NaOCl.

The next set of experiments involved the intermittent treatment of 30 minutes per day at 10 ppm of chemical solution ($ClO_2$, NaOCl) for 7 days. Only $ClO_2$ achieved a 50% mortality in the tests (at the end of 5 days) and 65% at the end of seven days.

The next experiments were carried out to evaluate continuous 24 hour treatment at concentrations of chemicals ($ClO_2$, NaOCl, KMnO, and $NaCLO_2$). Only $ClO_2$ achieved acceptable mortality rates: 50% at 2 ppm and 90% at 5 ppm. The other chemicals achieved no mortality or only 10%. In similar experiments at 48 hours of exposure, $ClO_2$ achieved 60% mortality at 1 ppm, 80% at 2 ppm; and 100% at 5 ppm.

Seventy-two hour exposure tests revealed that $ClO_2$ was effective at 0.25% (50% mortality) and 100% at 1.0, 2.0, and 5 ppm $ClO_2$ concentrations.

Ninety-six hour exposure tests revealed $ClO_2$ concentrations of 0.25 and 0.5 ppm resulted zebra mussel mortalities of 60 and 80%; and 100% for $ClO_2$ concentrations of 1.0 ppm and greater.

Additional tests were carried out to determine the effects of constant concentrations $ClO_2$ on zebra mussel mortality for exposure times ranging from 24 hours to 144 hours using two different sources of zebra mussel: Sample A, Sample B. The tests showing % mortality of the zebra mussels are summarized in the following Table:

TABLE IV

| Concentration $ClO_2$ (ppm) | Sample | Hours Exposure | | | | | |
|---|---|---|---|---|---|---|---|
| | | 24 | 48 | 72 | 92 | 120 | 144 |
| 0.25 | A | 0 | 0 | 50 | 60 | — | — |
| | B | 0 | 3 | 5 | 20 | 43 | 43 |
| 0.50 | A | 0 | 10 | 10 | 80 | — | — |
| | B | 5 | 18 | 28 | 35 | 48 | 68 |
| 1.0 | A | 10 | 60 | 100 | 100 | — | — |
| | B | 25 | 58 | 82 | 100 | 100 | — |

The above tests on Samples A and B of Zebra Mussels reveal that the type of treatment (e.g. $ClO_2$ concentration and duration) will depend on the zebra mussel. The sample B zebra mussels were much more resistent to the treatment, especially at lower concentrations.

What is claimed is:

1. A method of controlling infestation of zebra mussel in a water pumping facility having a suction crib located in a body of water, said method comprising:
   (a) positioning a chlorine dioxide generator at the surface of the body of water at a site approximately above the crib;
   (b) passing water through the chlorine dioxide generator to provide water discharged therefrom with from 500 to 3,000 milligrams per liter of chlorine dioxide dissolved therein;
   (c) injecting an aqueous solution of chlorine dioxide generated in step (a) into or adjacent the crib while flowing water from the body of water through the crib and to the pumping facility, the injection being in accordance with a predetermined treating period extending over a predetermined period of time, the concentration of the chlorine dioxide in the water flowing through the crib being sufficient to kill at least 50% of the zebra mussels which are contacted thereby, but averaging not more than 4 mg/l over the predetermined treating period;
   (d) discontinuing the generation of chlorine dioxide and the injection thereof into or adjacent the crib; and
   (e) repeating steps (a) through (d) at time intervals ranging from 1 month to 1 year.

2. The method of claim 1 wherein the injection is intermittent over the predetermined treating period in accordance with the following repeating cycles:
   an injection phase of from 1 minute to 2 hours of the aqueous solution of chlorine dioxide to provide the treated water with from 5 to 100 mg/l of chlorine dioxide, followed by a noninjection phase for 1 to 24 hours.

3. The method of claim 2 wherein the repeating cycles comprises from 2 to 45 minutes of an injection phase to provide the treated water with from 5 to 50 mg/l of chlorine dioxide, followed by 1 to 24 hours of a noninjection phase.

4. The method of claim 3 wherein the injection cycles are repeated from 2 to 6 times per day.

5. The method of claim 1 wherein the positioning of a chlorine dioxide generator is by a vessel carrying the generator, and wherein the vessel is removed from the positioning site after step (e).

6. A method of controlling infestation of zebra mussel in a water pumping facility having a suction pipe extending between a suction crib and the pumping facility, said crib being located in a body of water, said method comprising:
   (a) positioning a chlorine dioxide generator at the surface of the body of water at a site approximately above the crib;
   (b) passing water through the chlorine dioxide generator to provide water discharged therefrom with from 100 to 3,500 milligrams per liter of chlorine dioxide dissolved therein;
   (c) injecting an aqueous solution of chlorine dioxide generated in step (a) into the crib while flowing water from the body of water through the crib into the suction pipe and to the pumping facility, the injection being in accordance with a predetermined treating period extending over a predetermined period of time, the concentration of the chlorine dioxide in the water flowing into the suction pipe ranging from 0.25 to 5 ppm;
   (d) discontinuing the generation of chlorine dioxide and the injection thereof; and
   (e) repeating steps (a) through (d) at time intervals ranging from 1 week to 1 year.

7. The method of claim 6 wherein the injection is continuous and the predetermined treating period ranges from 1 to 14 days.

8. The method of claim 7 wherein the continuous injection of the chlorine dioxide solution provides the water entering the suction pipe with a chlorine dioxide concentration of 0.25 to 2.0 ppm and the injection period is from 2 to 7 days.

9. The method of claim 7 wherein the injection period is a function of the following chlorine dioxide concentrations in the water:
   (a) 0.25 to less than 1.0 ppm, the injection period is at least 2 days;
   (b) from 1.0 to 2.0 ppm, the injection period is at least 1 day.

10. The method of claim 7 wherein the chlorine dioxide concentration is between about 1.0 to about 1.5 ppm in the water; and the injection period ranges from about 2 to about 6 days; and the repeating step (e) ranges from 2 to 4 times per year.

11. The method of claim 6 wherein the concentration of the chlorine dioxide in the water being treated is sufficient to provide the water with a residual chlorine dioxide concentration of at least 1.0 ppm throughout the infested area.

12. The method of claim 1 wherein the chlorine dioxide is injected into the water immediately upstream of, or in, the suction pipe.

* * * * *